United States Patent
Kim et al.

(10) Patent No.: US 10,627,203 B2
(45) Date of Patent: Apr. 21, 2020

(54) TEST JIG FOR DOOR GLASS AND METHOD FOR MOUNTING THE SAME

(71) Applicants: Hyundai Motor Company, Seoul (KR); Kia Motors Corporation, Seoul (KR)

(72) Inventors: Jin Woo Kim, Incheon (KR); Il Yeong Seo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 245 days.

(21) Appl. No.: 15/789,714

(22) Filed: Oct. 20, 2017

(65) Prior Publication Data
US 2018/0340762 A1    Nov. 29, 2018

(30) Foreign Application Priority Data
May 29, 2017 (KR) .................. 10-2017-0066218

(51) Int. Cl.
| G01B 5/00 | (2006.01) |
| B60J 1/00 | (2006.01) |
| B60J 1/17 | (2006.01) |
| B60J 10/75 | (2016.01) |
| B60J 1/20 | (2006.01) |

(52) U.S. Cl.
CPC ............ G01B 5/0004 (2013.01); B60J 1/005 (2013.01); B60J 1/17 (2013.01); B60J 10/75 (2016.02); B60J 1/20 (2013.01)

(58) Field of Classification Search
CPC ..... B60J 1/005; B60J 1/20; B60J 10/75; B60J 1/17; B60J 10/70; G01B 5/0004
USPC .......................................... 33/613, 645, 533
See application file for complete search history.

(56) References Cited

U.S. PATENT DOCUMENTS

| 3,583,823 | A | * | 6/1971 | Eaton | B23B 49/02 408/115 R |
| 3,788,759 | A | * | 1/1974 | Grunert | B23B 47/28 408/115 R |
| 4,809,439 | A | * | 3/1989 | Burns | A47G 27/0487 33/42 |
| 4,914,822 | A | * | 4/1990 | Wetherington | B23Q 9/005 33/197 |
| 4,930,221 | A | * | 6/1990 | Taylor | B23Q 16/08 33/197 |
| 5,123,172 | A | * | 6/1992 | Thrun | E04F 21/00 269/905 |
| 5,737,844 | A | * | 4/1998 | Brumley | B25H 7/00 33/194 |
| 5,775,036 | A | * | 7/1998 | Stanley, Sr. | E04F 21/0015 248/354.4 |
| 5,829,123 | A | * | 11/1998 | Shashlo | B60J 1/005 29/703 |
| 6,134,799 | A | * | 10/2000 | Carroll | B60R 1/04 33/600 |
| 7,421,797 | B1 | * | 9/2008 | Servin | A47B 57/586 33/613 |

(Continued)

Primary Examiner — Yaritza Guadalupe-McCall
(74) Attorney, Agent, or Firm — Slater Matsil, LLP

(57) ABSTRACT

A test jig for a door glass includes a mounting block detachably mounted on a door panel of a vehicle door, and an adjustment block that has a vertical part to which a belt weatherstrip is detachably coupled and a horizontal part connected to the mounting block so as to be adjustable relative to the mounting block.

19 Claims, 9 Drawing Sheets

(56) References Cited

U.S. PATENT DOCUMENTS

| | | | | |
|---|---|---|---|---|
| 7,743,516 B2* | 6/2010 | Gross | .................... | E04F 19/02 |
| | | | | 33/194 |
| 8,286,362 B2* | 10/2012 | Petersheim | ............. | G01B 5/14 |
| | | | | 33/542 |
| 9,032,637 B2* | 5/2015 | Propp | ................... | B25H 7/04 |
| | | | | 33/613 |
| 9,279,654 B2* | 3/2016 | Han | ........................ | G01B 5/25 |
| 2008/0047152 A1* | 2/2008 | Wilding | ............. | E04F 21/0015 |
| | | | | 33/194 |
| 2014/0366394 A1* | 12/2014 | Han | ........................ | G01B 5/25 |
| | | | | 33/600 |
| 2016/0369555 A1* | 12/2016 | Riemelmoser | ........ | E06B 3/4609 |
| 2018/0340762 A1* | 11/2018 | Kim | ................... | G01B 5/0004 |

\* cited by examiner

TEST JIG FOR DOOR GLASS AND METHOD FOR MOUNTING THE SAME

CROSS-REFERENCE TO RELATED APPLICATIONS

This application claims priority to Korean Patent Application No. 10-2017-0066218, filed on May 29, 2017, in the Korean Intellectual Property Office, which application is hereby incorporated herein by reference.

TECHNICAL FIELD

The present disclosure relates to a test jig for a door glass and a method for mounting the same.

BACKGROUND

As illustrated in FIG. 1, a door glass 15 that is movable in a vertical direction is installed in a vehicle door 10, and door panels 11 and 12 of the vehicle door 10 are disposed on both sides of the door glass 15. The door panels 11 and 12 include the inner panel 11 and the outer panel 12.

An inner belt weatherstrip 21 is coupled to an upper end of the inner panel 11, and an outer belt weatherstrip 22 is coupled to an upper end of the outer panel 12. The outer belt weather strip 22 may have a hook 24 coupled to an opening 12a of the outer panel 12 by a snap-fit connection.

The inner belt weatherstrip 21 and the outer belt weatherstrip 22 are configured to prevent moisture, foreign substances, and the like from infiltrating into the vehicle door 10.

Meanwhile, worst-case scenario testing associated with mobility of the door glass is performed when a prototype vehicle body is manufactured.

When the worst-case scenario testing is performed, lips 21a of the inner belt weatherstrip 21 in frictional contact with one surface of the door glass 15 or lips 22a of the outer belt weatherstrip 22 in frictional contact with the other surface of the door glass 15 may generate various kinds of noises with the vertical movement of the door glass 15. In the case where the gap g1 between the inside of the door glass 15 and the inner panel 11 and the gap g2 between the outside of the door glass 15 and the outer panel 12 do not accord with designed dimensions due to the manufacturing tolerance and deviation of the inner panel 11 and/or the outer panel 12, the inner surface of the door glass 15 may be in frictional contact with the inner belt weatherstrip 21 or the outer surface of the door glass 15 may be in frictional contact with the outer belt weatherstrip 22, and thus noise may be generated when the door glass 15 moves.

In the case where noise is generated with the movement of the door glass in the worst-case scenario testing for the door glass, relevant components (a door glass run, the inner belt weatherstrip, the outer belt weatherstrip, a door module, and the like of the vehicle door) for moving the door glass have to be repeatedly assembled and disassembled depending on the condition of the door panels after the inner panel, the outer panel, the inner belt weatherstrip, the outer belt weatherstrip, and the like are manufactured again or corrected.

As described above, an excessive amount of time is required to manufacture or assemble the relevant components in the worst-case scenario testing for the door glass, and therefore the reliability and convenience of the test for mobility of the door glass may be degraded.

SUMMARY

Embodiments of the present disclosure relate to a test jig for a door glass and a method for mounting the test jig, the test jig being configured to adjust the gap between a belt weatherstrip and the door glass in an easy and simple manner when mobility (lifting performance) of the door glass is tested, thereby making it possible to rapidly and conveniently test whether noise is generated by frictional contact between the door glass and the belt weatherstrip.

Embodiments of the present disclosure can solve the above-mentioned problems occurring in the related art while advantages achieved by the related art are maintained intact.

An aspect of the present disclosure provides a test jig for a door glass and a method for mounting the test jig. The test jig is configured to adjust the gap between a belt weatherstrip and the door glass in an easy and simple manner when mobility (lifting performance) of the door glass is tested. This feature makes it possible to rapidly and conveniently test whether noise is generated by frictional contact between the door glass and the belt weatherstrip.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a test jig for a door glass may include a mounting block detachably mounted on a door panel of a vehicle door and an adjustment block that has a vertical part to which a belt weatherstrip is detachably coupled and a horizontal part connected to the mounting block so as to be adjustable relative to the mounting block.

The mounting block may have one or more grooves mounted on an upper end of the door panel.

The mounting block may have one or more first fastening holes in communication with the grooves, and a first fixing bolt may be fastened to the one or more first fastening holes.

An upper surface of the mounting block may be formed to be flat in a horizontal direction, and the adjustment block may be detachably coupled to the flat upper surface of the mounting block.

The mounting block may have one or more second fastening holes, and the second fastening holes may be formed in a vertical direction. The adjustment block may be coupled to the upper surface of the mounting block by fastening a second fixing bolt to the second fastening holes.

The horizontal part of the adjustment block may have one or more fastening slots extending along a width direction of the vehicle door, and the second fixing bolt may be fastened to the fastening slots and the second fastening holes.

The vertical part of the adjustment block may have one or more openings to which hooks of the belt weatherstrip are coupled by a snap-fit connection.

The vertical part of the adjustment block may have two or more openings with different heights to which hooks of different types of belt weatherstrips are coupled by a snap-fit connection.

The mounting block may have a scale formed on at least one side surface of the mounting block.

The length of the mounting block may be longer than the length of the adjustment block.

The mounting block may have a first reference surface and a second reference surface perpendicular to each other. The first reference surface may be formed to be flat in a vertical direction, and the second reference surface may be formed to be flat in a horizontal direction.

According to another aspect of the present disclosure, a test jig for a door glass may include a mounting unit detachably mounted on a door panel of a vehicle door. A first adjustment block is connected to the mounting unit so as to be adjustable relative to the mounting unit along a first direction. A second adjustment block has a vertical part to which a belt weatherstrip is detachably coupled and a horizontal part connected to the first adjustment block so as to be adjustable relative to the first adjustment block along a second direction. The first and second directions may be perpendicular to each other.

The mounting unit may include a first mounting block having a contact surface making contact with the door panel and a second mounting block connected to the first mounting block.

The first mounting block may have a groove into which the first adjustment block is inserted to slide relative to the first adjustment block along the first direction.

A guide protrusion may be formed on a side of the first adjustment block, and a guide groove into which the guide protrusion is slidably inserted may be connected to the groove of the first mounting block.

A support lever may be attached to the second mounting block. One end of the support lever may be pivotally connected to the second mounting block, and the support lever may have, on an opposite end of the support lever, an attachment part that is to be attached to a side surface of the door panel.

According to another aspect of the present disclosure, a method can be used for mounting a test jig for a door glass. The test jig has a mounting block detachably mounted on a door panel of a vehicle door and an adjustment block that has a vertical part to which a belt weatherstrip is detachably coupled and a horizontal part connected to the mounting block so as to be adjustable relative to the mounting block. The method may include mounting the mounting block on an upper end of the door panel, coupling the belt weatherstrip to the vertical part of the adjustment block, and adjusting the gap between the vertical part of the adjustment block and the door glass and then coupling the horizontal part of the adjustment block to the mounting block.

According to the present disclosure, when mobility (lifting performance) of a door glass is tested, the gap between the door glass and a belt weatherstrip may be adjusted in an easy and simple manner without having to manufacture an inner panel, an outer panel, and the belt weatherstrip again according to the test result, and thus it is possible to rapidly and conveniently test whether noise is generated by frictional contact between the moving door glass and the belt weatherstrip.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
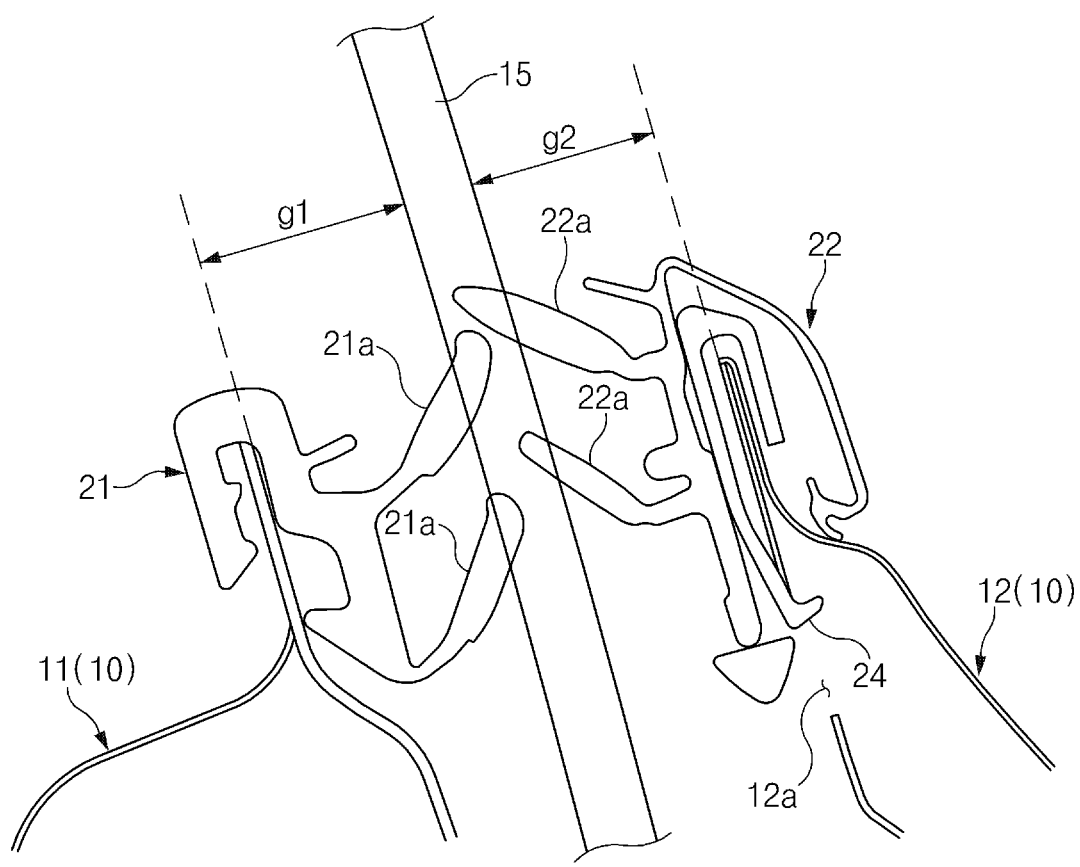
FIG. 1 is a sectional view illustrating a structure in which a door glass, an inner belt weatherstrip, and an outer belt weatherstrip are installed in a vehicle door.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
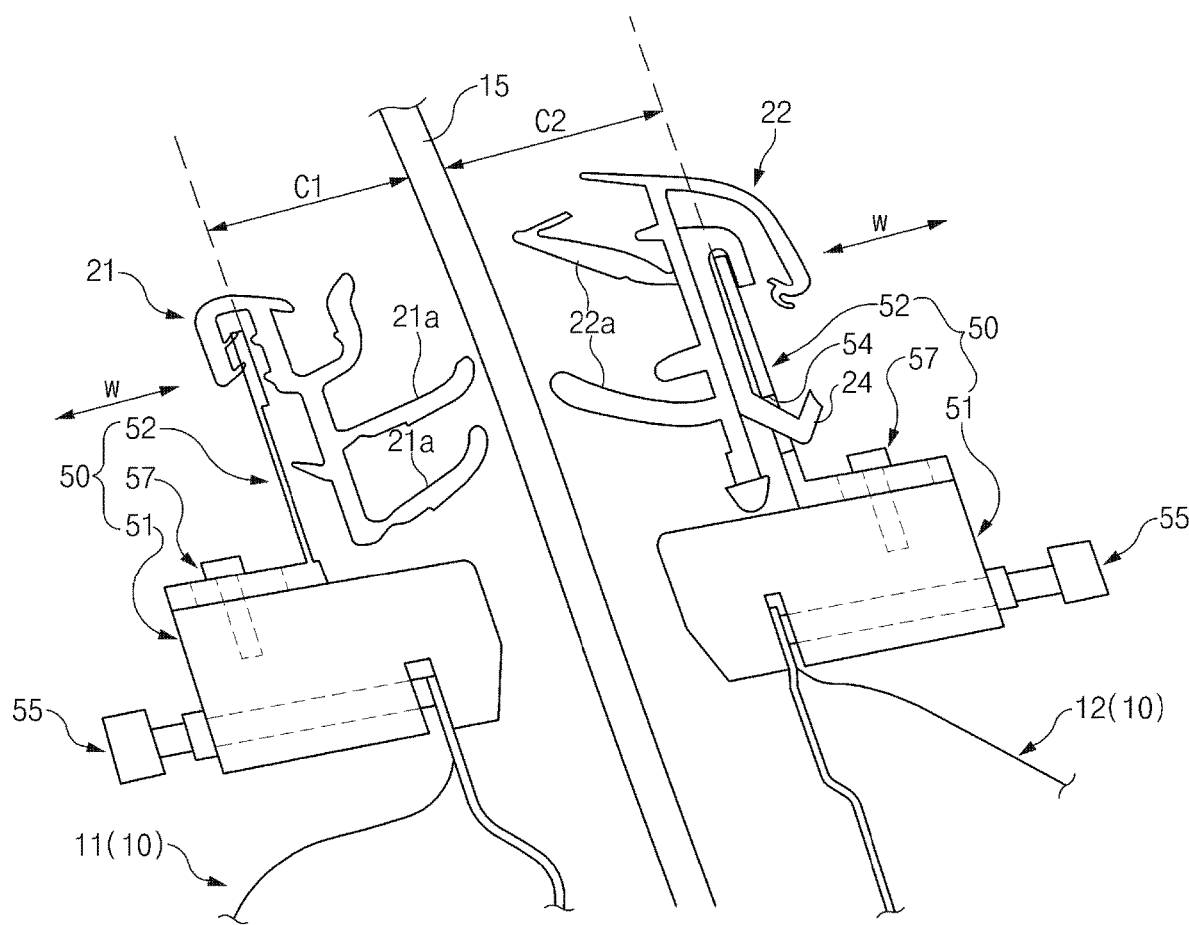
FIG. 2 is a sectional view illustrating a structure in which a test jig for a door glass, according to an embodiment of the present disclosure, is mounted on a vehicle door.

Referring to FIG. 2, a test jig 50 for a door glass, according to an embodiment of the present disclosure, may include a mounting block 51 detachably mounted on a door panel 11, 12 of a vehicle door 10 and an adjustment block 52 connected to the mounting block 51 so as to be adjustable relative to the mounting block 51.

Figure 3:
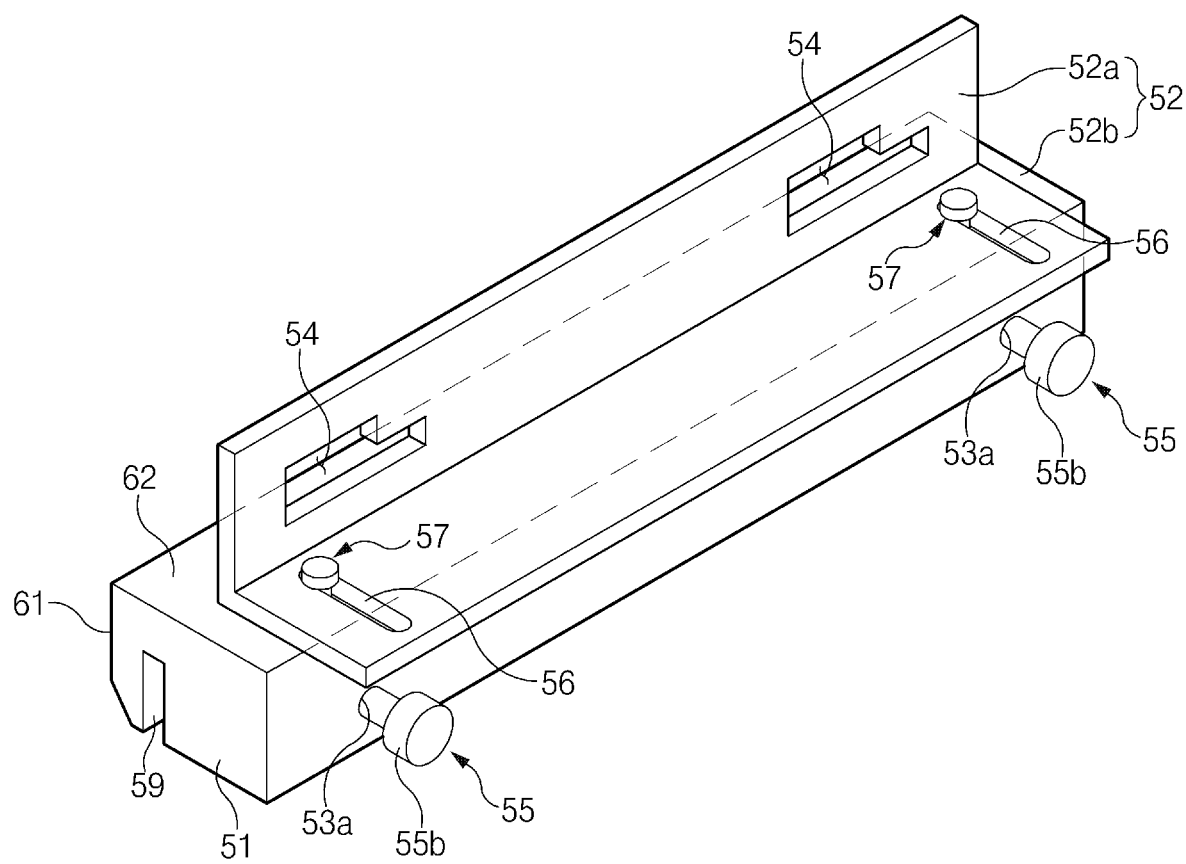
FIG. 3 is a perspective view of a test jig for a door glass, according to an embodiment of the present disclosure.

As illustrated in FIG. 3, the mounting block 51 may have a bar shape, the length of which is greater than the width. The mounting block 51 may extend in the lengthwise direction of the vehicle door 10 and may be arranged along the lengthwise direction of the vehicle door 10.

An upper surface of the mounting block 51 may be formed to be flat in a horizontal direction, and the adjustment block 52 may be connected to the flat upper surface of the mounting block 51 so as to be adjustable relative to the mounting block 51.

The mounting block 51 may have one or more grooves 59 formed in a lower portion thereof. The mounting block 51 may be mounted on an upper end of each door panel 11, 12 by the upper end of each door panel 11, 12 fitting into the one or more grooves 59 of the mounting block 51. The width and height of the one or more grooves 59 may be diversely designed without affecting the rigidity of the mounting block 51.

Figure 4:
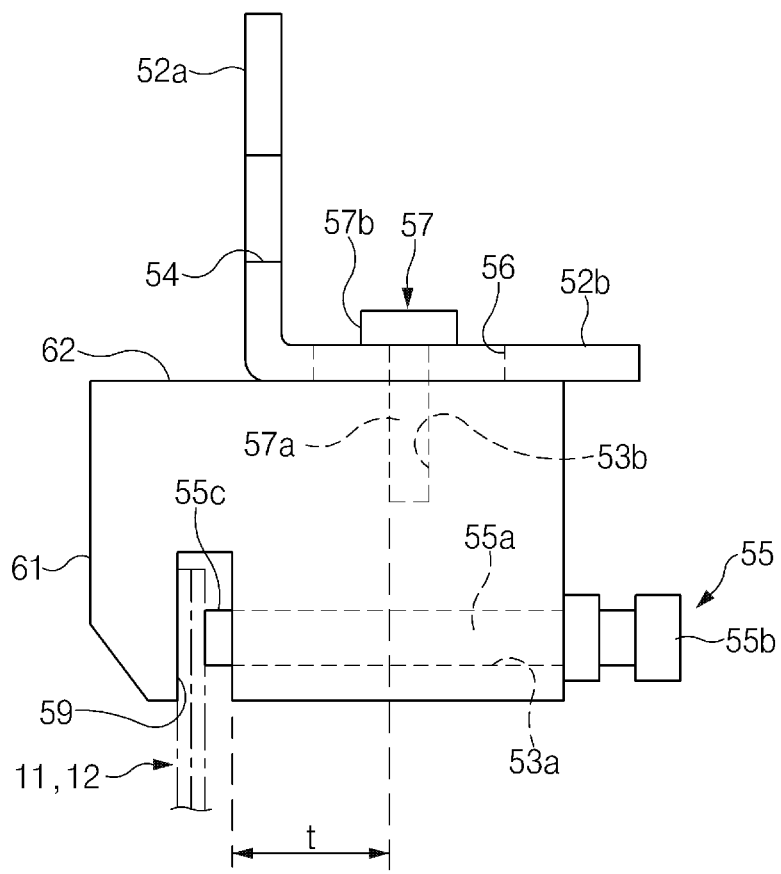
FIG. 4 is a side view of the test jig for a door glass, according to an embodiment of the present disclosure.

As illustrated in FIGS. 2 and 4, the mounting block 51 may have one or more first fastening holes 53a formed in the front surface thereof, and the first fastening holes 53a may be formed in a horizontal direction to communicate with the grooves 59. The axial direction of each first fastening hole 53a and the axial direction of the grooves 59 may be perpendicular to each other. A threaded part 55a of a first fixing bolt 55 may be fastened to each first fastening hole 53a to secure the mounting block 51 to the upper end of each door panel 11, 12. When the threaded part 55a of the first fixing bolt 55 is fastened to the first fastening hole 53a, a distal end portion 55c of the threaded part 55a may press the upper end of each door panel 11, 12 to secure the mounting block 51 to the upper end of each door panel 11, 12.

Figure 7:
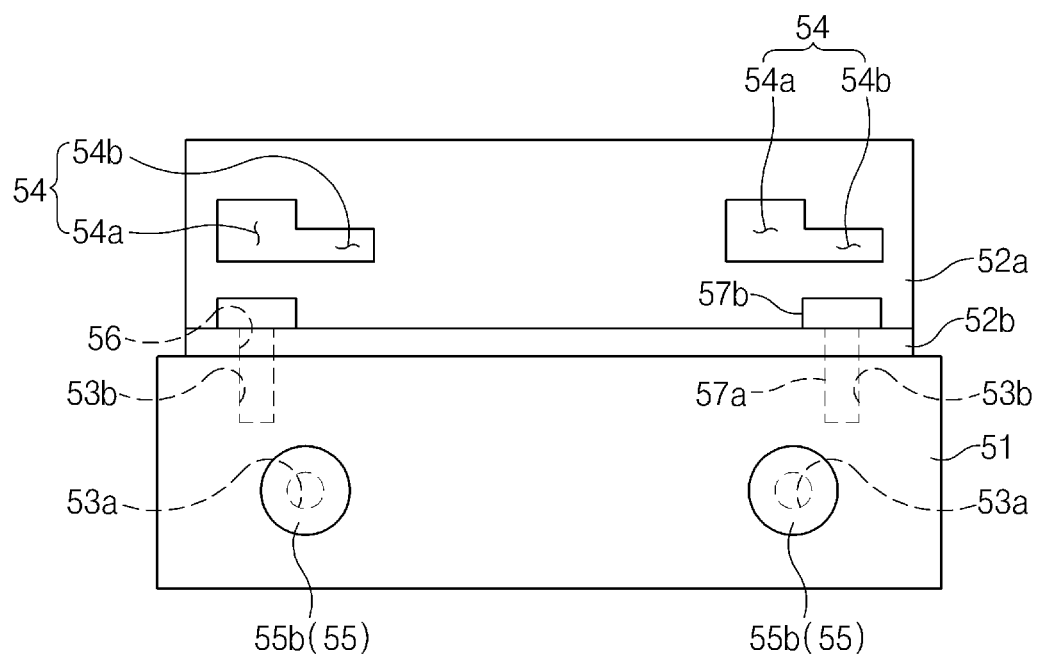
FIG. 7 is a front view of the test jig for a door glass, according to an embodiment of the present disclosure.

According to an embodiment, the plurality of first fastening holes 53a may be spaced apart from one another and may be arranged to be symmetric with respect to the center of the mounting block 51. As illustrated in FIG. 7, two first fastening holes 53a may be formed in the mounting block 51, and the respective first fastening holes 53a may be located close to opposite end portions of the mounting block 51, which makes it possible to firmly couple the mounting block 51 to the door panel 11, 12.

The first fixing bolt 55 may include the threaded part 55a and a head 55b, and the head 55b may have a cross-shaped groove or a straight groove formed therein. Accordingly, a worker may more easily and simply fasten or loosen the first fixing bolt 55 in a narrow space. Alternatively, the first fixing bolt 55 may be a headless bolt having no head and may have a hexagonal recess formed on an end portion thereof.

As illustrated in FIGS. 2 and 4, the mounting block 51 may have one or more second fastening holes 53b formed in the upper surface thereof, and the second fastening holes 53b may be formed in the vertical direction. Second fixing bolts 57 may be fastened to the respective second fastening holes 53b to secure the adjustment block 52.

The second fastening holes 53b and the grooves 59 may be spaced apart from each other by a constant distance t, which makes it possible to ensure a sufficient distance by which the adjustment block 52 is movable. The distance t between the second fastening holes 53b and the grooves 59 may be diversely designed to ensure a distance by which the adjustment block 52 is movable without affecting the rigidity of the mounting block 51.

According to an embodiment, the plurality of second fastening holes 53b may be spaced apart from one another and may be arranged to be symmetric with respect to the center of the mounting block 51. As illustrated in FIG. 7, two second fastening holes 53b may be arranged so as to be spaced apart from each other, and the respective second fastening holes 53b may be located close to the opposite end portions of the mounting block 51, which makes it possible to firmly couple the adjustment block 52 to the mounting block 51 without a movement. In particular, the second fastening holes 53b may be located closer to the opposite end portions of the mounting block 51 than the first fastening holes 53a.

Figure 5:
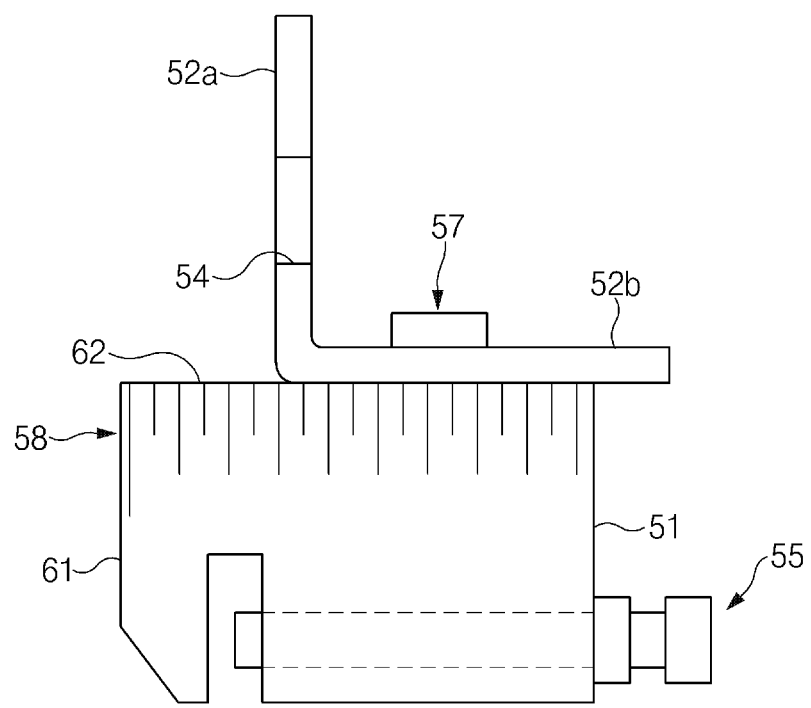
FIG. 5 is a side view of a test jig for a door glass, according to another embodiment of the present disclosure.

According to an embodiment, as illustrated in FIG. 5, the mounting block 51 may have a scale 58, and the scale 58 may be formed on at least one side surface of the mounting block 51. Accordingly, the position of the adjustment block 52 may be more accurately adjusted by using the scale 58 of the mounting block 51.

As illustrated in FIG. 2, the adjustment block 52 may include a vertical part 52a to which a belt weatherstrip 21, 22 is detachably coupled and a horizontal part 52b connected to the mounting block 51 so as to be adjustable relative to the mounting block 51.

The vertical part 52a may extend in the vertical direction, and the belt weatherstrip 21, 22 may be detachably coupled to an upper end of the vertical part 52a. The vertical part 52a may have one or more openings 54 to which hooks 24 of the outer belt weatherstrip 22 are coupled by a snap-fit connection. The positions, dimensions, and shapes of the hooks 24 may be varied depending on the shape or structure of the outer panel 12. To correspond to the variation in the positions, dimensions, and shapes of the hooks 24, the one or more openings 54 may have two or more openings 54a and 54b with different heights. Accordingly, different types of hooks 24 of the outer belt weatherstrip 22 may be selectively coupled to the two or more openings 54a and 54b by a snap-fit connection. Since the two or more openings 54a and 54b are formed in communication with each other, the openings 54a and 54b may be formed in a stepped structure.

The horizontal part 52b may extend in a horizontal direction, and the position of the horizontal part 52b on the upper surface of the mounting block 51 may be adjusted along the width direction of the vehicle door 10 (see the direction W of the arrow in FIG. 2).

Figure 6:
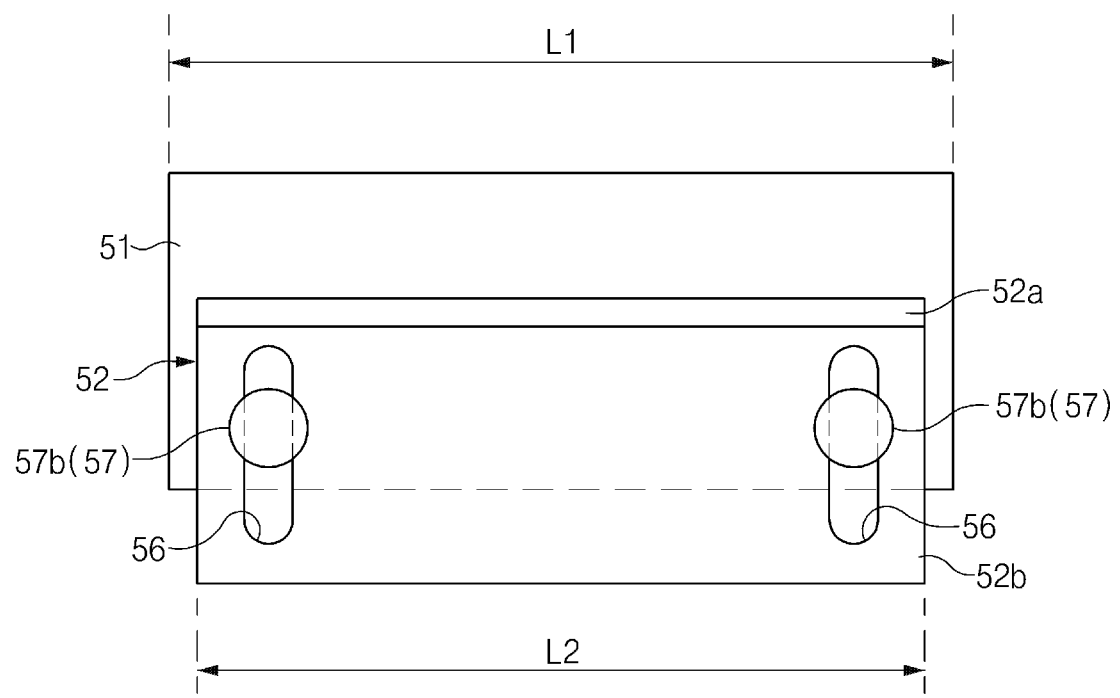
FIG. 6 is a plan view of the test jig for a door glass, according to an embodiment of the present disclosure.

The horizontal part 52b may have one or more fastening slots 56 extending in the width direction of the vehicle door 10 (see the direction W of the arrow in FIG. 2), and as illustrated in FIGS. 6 and 7, the respective fastening slots 56 may be formed at the positions corresponding to the second fastening holes 53b of the mounting block 51.

According to an embodiment, the plurality of fastening slots 56 may be spaced apart from one another and may be arranged to be symmetric with respect to the center of the mounting block 51. As illustrated in FIG. 6, two fastening slots 56 may be arranged so as to be spaced apart from each other, and the respective fastening slots 56 may be located close to the opposite end portions of the mounting block 51, which makes it possible to firmly couple the adjustment block 52 to the mounting block 51 without a movement. In particular, the fastening slots 56 may be located closer to the opposite end portions of the mounting block 51 than the first fastening holes 53a.

As the horizontal part 52b of the adjustment block 52 moves on the upper surface of the mounting block 51 along the width direction of the vehicle door 10 (see the direction W of the arrow in FIG. 2), the position of the horizontal part 52b may be adjusted. If the position of the horizontal part 52b is adjusted, the second fixing bolts 57 may be fastened to the fastening slots 56 of the horizontal part 52b and the second fastening holes 53b, and thus the horizontal part 52b may be secured to the upper surface of the mounting block 51. The position of the horizontal part 52b of the adjustment block 52 may be accurately adjusted along the scale 58 of the mounting block 51.

Each of the second fixing bolts 57 may have a threaded part 57a and a head 57b. The threaded parts 57a of the second fixing bolts 57 may be fastened to the fastening slots 56 of the horizontal part 52b and the second fastening holes 53b, and thus the horizontal part 52b of the adjustment block 52 may be secured to the upper surface of the mounting block 51.

The heads 57b of the second fixing bolts 57 may have a diameter larger than the width of the fastening slots 56. The heads 57b of the second fixing bolts 57 may have a cross-shaped groove or a straight groove formed therein. Accordingly, a worker may more easily and simply fasten or loosen the second fixing bolts 57 in a narrow space.

Since the horizontal part 52b is secured to the upper surface of the mounting block 51 by the second fixing bolts 57 after the adjustment of the position of the horizontal part 52b on the upper surface of the mounting block 51, the gap between the vertical part 52a of the adjustment block 52 and a door glass 15 may be adjusted, and thus the contact gap between the belt weatherstrip 21, 22 coupled to the vertical part 52a and the door glass 15 may be adjusted.

As illustrated in FIG. 6, the mounting block 51 may have a length L1 longer than the length L2 of the adjustment block 52, and thus the horizontal part 52b of the adjustment block 52 may be stably seated on the upper surface of the mounting block 51.

The mounting block 51 may have first and second reference surfaces 61 and 62 perpendicular to each other to verify perpendicularity between the vertical part 52a and the horizontal part 52b of the adjustment block 52. The first reference surface 61 may be formed to be flat in the vertical direction, and the second reference surface 62 may be formed to be flat in a horizontal direction. Since the perpendicularity between the vertical part 52a and the horizontal part 52b of the adjustment block 52 may be varied while the test jig 50 is being used, it is possible to accurately verify the perpendicularity between the vertical part 52a and the horizontal part 52b of the adjustment block 52 by using the first and second reference surfaces 61 and 62.

The mounting block 51 and the adjustment block 52 may be formed of metal or a synthetic resin having predetermined rigidity, and thus damage may be prevented when the mounting block 51 and the adjustment block 52 are mounted or separated.

According to an embodiment, the mounting block 51 may be formed of relatively light metal (such as aluminum), and the adjustment block 52 may be formed of a material (such as steel) that has higher rigidity than the mounting block 51.

Meanwhile, the inner panel 11 and the outer panel 12 of the vehicle door 10 may have a structure curved along the lengthwise direction of the vehicle door 10. Accordingly, the gap between the inner panel 11 and the door glass 15 and the gap between the outer panel 12 and the door glass 15 may differ from each other along the lengthwise direction of the vehicle door 10. To correspond to the difference, a plurality of test jigs 50 may be mounted along the lengthwise direction of the vehicle door 10. The plurality of test jigs 50 may have different lengths to correspond to the curvature of the vehicle door 10 in the lengthwise direction. Therefore, the plurality of test jigs 50 may be mounted to correspond to the curved structure of the vehicle door 10.

As illustrated in FIG. 2, a pair of test jigs 50 for a door glass may be mounted to correspond to the inner belt weatherstrip 21 and the outer belt weatherstrip 22 disposed on opposite sides of the door glass 15.

The pair of test jigs 50 for a door glass may be separately mounted on the inner panel 11 and the outer panel 12, and the inner and outer belt weatherstrips 21 and 22 may be separately coupled to the respective test jigs 50 for a door glass.

The respective mounting blocks 51 may be separately secured to the inner and outer panels 11 and 12 by mounting the grooves 59 of the respective mounting blocks 51 on the upper ends of the inner and outer panels 11 and 12 and then fastening the first fixing bolts 55 to the first fastening holes 53a.

The inner and outer belt weatherstrips 21 and 22 may be separately coupled to the upper ends of the respective adjustment blocks 52, and the adjustment blocks 52 may be secured to the upper surfaces of the respective mounting blocks 51 by adjusting the positions of the adjustment blocks 52 on the upper surfaces of the mounting blocks 51 and then fastening the second fixing bolts 57 to the second fastening holes 53b. Accordingly, the gaps C1 and C2 between the door glass 15 and the vertical parts 52a of the respective adjustment blocks 52 may be appropriately adjusted.

Worst-case scenario testing for mobility of the door glass 15 may be performed in the state in which the pair of test jigs 50 for a door glass has been mounted on the inner and outer panels 11 and 12 of the vehicle door 10 as described above. As illustrated in Table 1 below, the gaps C1 and C2 between the door glass 15 and the vertical parts 52a of the respective adjustment blocks 52 may be adjusted to test whether noise is generated by frictional contact between the door glass 15 and the belt weatherstrips 21 and 22.

TABLE 1

|  | −1 mm | −1.5 mm | −2.0 mm | −2.5 mm | −3.0 mm | −3.5 mm |
| --- | --- | --- | --- | --- | --- | --- |
| Related Art | Noiseless | Noiseless | Noise | Noise | Noise | Noise |
| Present Disclosure | Noiseless | Noiseless | Noiseless | Noiseless | Little Noise | Noise |

Table 1 shows results obtained by testing whether noise was generated by a vertical movement of the door glass 15, after decreasing the gaps C1 and C2 between the door glass 15 and the vertical parts 52a of the respective adjustment blocks 52 by −1 mm, −1.5 mm, −2.0 mm, −3.0 mm, and −3.5 mm with respect to their designed dimensions in the state in which a test jig in the related art and the test jig 50 of the present disclosure were applied.

As shown in Table 1 above, in the case of the test jig in the related art, noise was generated when the gaps C1 and C2 between the door glass 15 and the vertical parts 52a of the respective adjustment blocks 52 were decreased by −2.0 mm to −3.5 mm, whereas in the case of the test jig 50 of the present disclosure, noise was generated when the gaps C1 and C2 between the door glass 15 and the vertical parts 52a of the respective adjustment blocks 52 were decreased by −3.0 mm to −3.5 mm.

As described above, the test jig 50 of the present disclosure may additionally ensure a margin of about −1 mm for the gaps C1 and C2 between the door glass 15 and the vertical parts 52a of the respective adjustment blocks 52, compared to the test jig in the related art.

When worst-case scenario testing for mobility of the door glass 15 is performed, the gaps between the door glass 15 and the belt weatherstrips 21 and 22 may be easily adjusted by using the test jig 50 of the present disclosure, and thus the convenience and speed of the test may be enhanced.

In addition, a numerical limit on the gaps between the door glass 15 and the belt weatherstrips 21 and 22 may be quantified by using the test jig 50 of the present disclosure, and thus the reliability of the test may be significantly enhanced.

Figure 8:
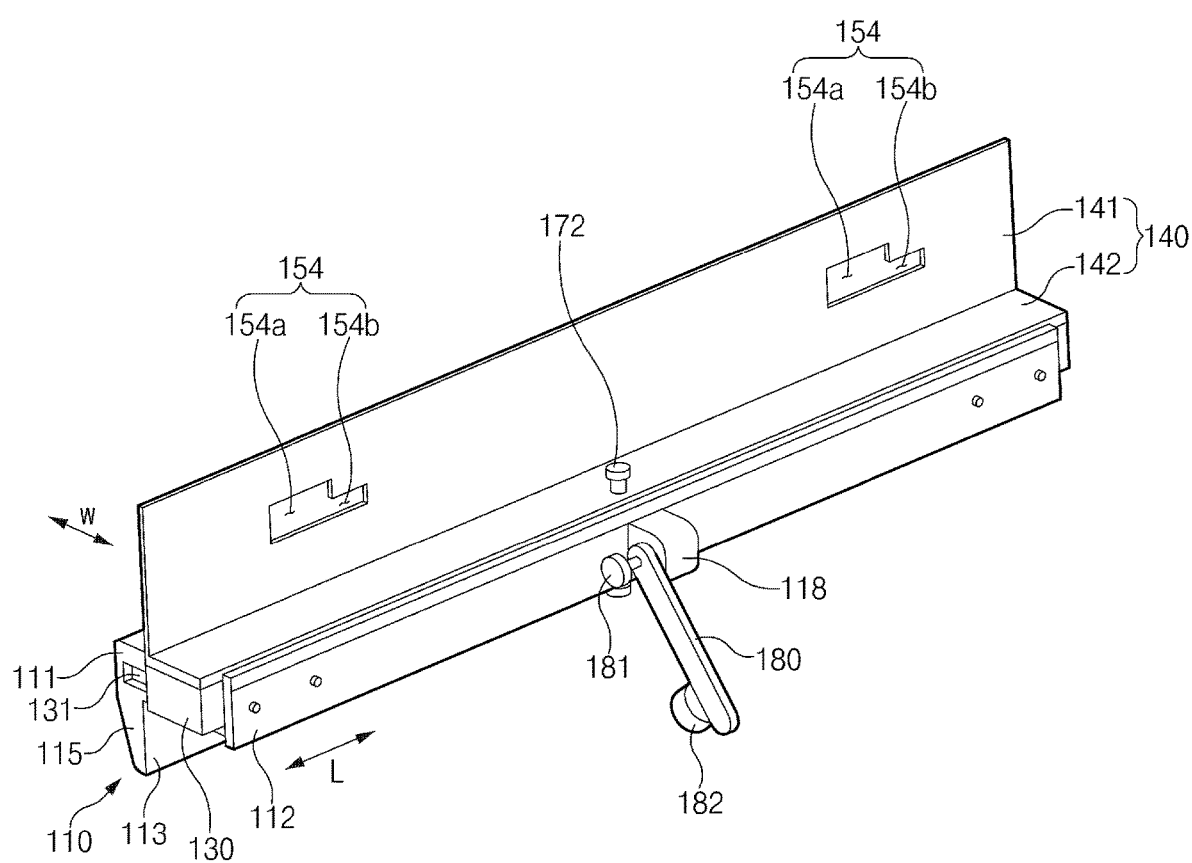
FIG. 8 is a perspective view of a test jig for a door glass, according to another embodiment of the present disclosure.
Figure 9:
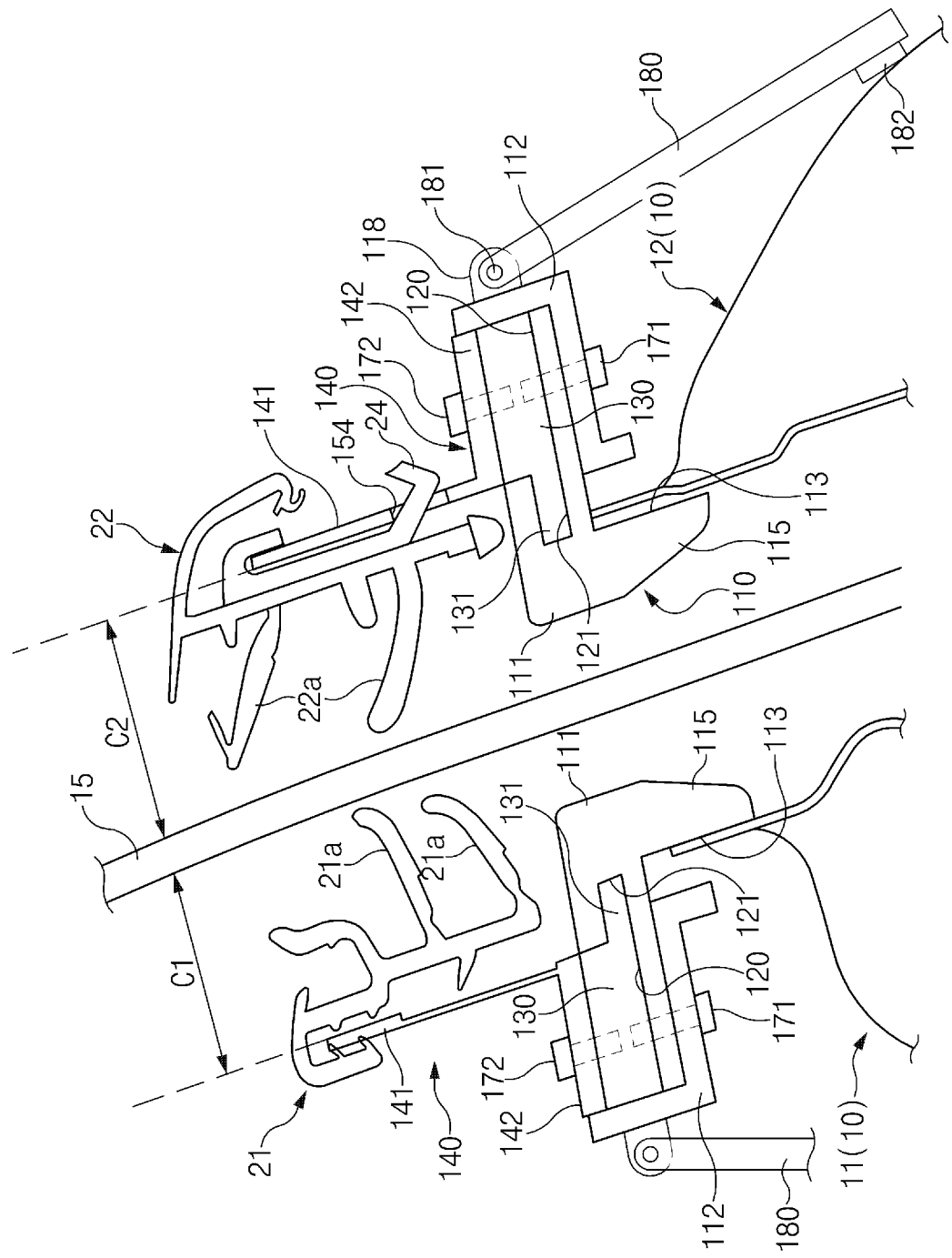
FIG. 9 is a sectional view illustrating a structure in which the test jig for a door glass, which is illustrated in FIG. 8, is mounted on a vehicle door.

FIGS. 8 and 9 illustrate a test jig 100 according to another embodiment of the present disclosure.

Referring to FIGS. 8 and 9, the test jig 100 according to another embodiment of the present disclosure may include a mounting unit no detachably mounted on the door panel 11, 12 of the vehicle door 10, a first adjustment block 130 connected to the mounting unit no so as to be adjustable relative to the mounting unit no in a first direction (see the direction L of the arrow in FIG. 8), and a second adjustment block 140 connected to the first adjustment block 130 so as to be adjustable relative to the first adjustment block 130 in a second direction (see the direction W of the arrow in FIG. 8).

The mounting unit no may include a first mounting block 111 and a second mounting block 112 connected to the first mounting block 111.

The first mounting block 111 may have a contact surface 113 that makes contact with an upper end of the inner panel 11 or an upper end of the outer panel 12. The first mounting block 111 may have, on one end thereof, a protrusion 115 protruding downward, and the contact surface 113 may be formed on the front side of the protrusion 115 so as to be flat in a horizontal direction.

The first mounting block 111 may have a groove 120 formed therein, and the first adjustment block 130 may be inserted into the groove 120 to slide relative to the first mounting block 111. The position of the first adjustment block 130 in the groove 120 may be adjusted along the first direction (see the direction L of the arrow in FIG. 8). Here, the first direction may correspond to the lengthwise direction of the vehicle door 10.

The first adjustment block 130 may have a guide protrusion 131 formed on one side thereof, and a guide groove 122 into which the guide protrusion 131 is slidably inserted may be connected to the groove 120. Accordingly, the position of the first adjustment block 130 in the groove 120 may be accurately adjusted along the first direction (see the direction L of the arrow in FIG. 8) as the guide protrusion 131 is guided along the guide groove 122.

After the position of the first adjustment block 130 is adjusted within the groove 120 of the first mounting block 111 along the first direction, a first fixing bolt 171 may be fastened through the first mounting block 111, the second mounting block 112, and the first adjustment block 130, and thus the first adjustment block 130 may be secured to the first and second mounting blocks 111 and 112.

The second mounting block 112 may be connected to the first mounting block 111 by the first fixing bolt 171, and a support lever 180 may be attached to the second mounting block 112. The support lever 180 may be pivotally connected, at one end thereof, to a pivot part 118 of the second mounting block 112, and may have an attachment part 182 on an opposite end thereof. The one end of the support lever 180 may be pivotally connected to the pivot part 118 of the second mounting block 112 through a pivot pin 181. The attachment part 182 may be detachably attached to a side surface of the door panel 11, 12.

After the one end of the support lever 180 pivots, the attachment part 182 of the support lever 180 may be attached to the side surface of the door panel 11, 12, and the support lever 180 may support the mounting unit no on the door panel 11, 12.

As illustrated in FIG. 9, the second adjustment block 140 may include a vertical part 141 to which the belt weatherstrip 21, 22 is detachably coupled and a horizontal part 142 connected to the first adjustment block 130 so as to be adjustable relative to the first adjustment block 130 in the second direction (see the direction W of the arrow in FIG. 8). Here, the second direction W may correspond to the width direction of the vehicle door 10, and the first direction L and the second direction W may be perpendicular to each other.

The vertical part 141 may extend in the vertical direction, and the belt weatherstrip 21, 22 may be detachably coupled to an upper end of the vertical part 141. The vertical part 141 may have one or more openings 154 to which the hooks 24 of the outer belt weatherstrip 22 are coupled by a snap-fit connection. The positions, dimensions, and shapes of the hooks 24 may be varied depending on the shape or structure of the outer panel 12. To correspond to the variation in the positions, dimensions, and shapes of the hooks 24, the one or more openings 154 may have two or more openings 154a and 54b with different heights. Since the two or more openings 154a and 54b are formed in communication with each other, the openings 154a and 54b may be formed in a stepped structure.

The horizontal part 142 may extend in a horizontal direction, and the position of the horizontal part 142 on the upper surface of the first adjustment block 130 may be adjusted along the second direction (see the direction W of the arrow in FIG. 8).

After the position of the horizontal part 142 on the upper surface of the first adjustment block 130 is adjusted along the second direction, a second fixing bolt 172 may be fastened to the horizontal part 142 and the first adjustment block 130, and thus the horizontal part 142 of the second adjustment block 140 may be secured to the first adjustment block 130.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A test jig for testing mobility of a door glass installed in a vehicle door so as to be movable in a vertical direction, the test jig comprising:
   a mounting block to be detachably mounted on a door panel of the vehicle door; and
   an adjustment block having a vertical part to which a belt weatherstrip is to be detachably coupled and a horizontal part connected to the mounting block so as to be adjustable relative to the mounting block, wherein the vertical part of the adjustment block has an opening to which a hook of the belt weatherstrip are to be coupled by a snap-fit connection.

2. The test jig of claim 1, wherein the mounting block has a groove, an upper end of the door panel fitting into the groove.

3. The test jig of claim 2, wherein the mounting block has a first fastening hole in communication with the groove, and wherein a fixing bolt is fastened to the first fastening hole.

4. The test jig of claim 1, wherein the mounting block has a flat upper surface in a horizontal direction, and wherein the adjustment block is detachably coupled to the flat upper surface of the mounting block.

5. The test jig of claim 4, wherein the mounting block has a second fastening hole,
   wherein the second fastening hole is formed in the vertical direction, and
   wherein the adjustment block is coupled to the upper surface of the mounting block by fastening a second fixing bolt to the second fastening holes.

6. The test jig of claim 5, wherein the horizontal part of the adjustment block has a fastening slots extending along a width direction of the vehicle door, and
   wherein the second fixing bolt is fastened to the fastening slot and the second fastening hole.

7. The test jig of claim 1, wherein the vertical part of the adjustment block has a plurality of openings with different heights to which hooks of different types of belt weatherstrips are to be coupled by a snap-fit connection.

8. The test jig of claim 1, wherein the mounting block has a scale formed on at least one side surface of the mounting block.

9. The test jig of claim 1, wherein the mounting block has a first length and adjustment block has a second length that is longer than the first length.

10. The test jig of claim 1, wherein the mounting block has a first reference surface and a second reference surface perpendicular to each other,
wherein the first reference surface is flat in the vertical direction, and
wherein the second reference surface is flat in a horizontal direction.

11. A method of making a vehicle using the test jig of claim 1, the method comprising:
assembling the vehicle door by assembling a door glass between an inner panel and an outer panel of a door panel of the vehicle door;
mounting the mounting block on an upper end of the door panel;
coupling the belt weatherstrip to the vertical part of the adjustment block; and
adjusting a gap between the vertical part of the adjustment block and the door glass and then coupling the horizontal part of the adjustment block to the mounting block.

12. A test jig for testing mobility of a door glass installed in a vehicle door so as to be movable in a vertical direction, the test jig comprising:
a mounting unit to be detachably mounted on a door panel of the vehicle door;
a first adjustment block connected to the mounting unit so as to be adjustable relative to the mounting unit along a first direction; and
a second adjustment block having a vertical part to which a belt weatherstrip is to be detachably coupled and a horizontal part connected to the first adjustment block so as to be adjustable relative to the first adjustment block along a second direction, the second direction perpendicular to the first direction.

13. The test jig of claim 12, wherein the mounting unit includes a first mounting block having a contact surface to make contact with the door panel and a second mounting block connected to the first mounting block.

14. The test jig of claim 13, wherein the first mounting block has a groove into which the first adjustment block is inserted to slide relative to the first adjustment block along the first direction.

15. The test jig of claim 14, wherein a guide protrusion is formed on a side of the first adjustment block, and wherein a guide groove into which the guide protrusion is slidably inserted is connected to the groove of the first mounting block.

16. The test jig of claim 13, wherein a support lever is attached to the second mounting block;
wherein one end of the support lever is pivotally connected to the second mounting block; and
wherein the support lever has, on an opposite end of the support lever, an attachment part that is to be attached to a side surface of the door panel.

17. A method of making a vehicle using the test jig of claim 12, the method comprising:
assembling the vehicle door by assembling the door glass between an inner panel and an outer panel of a door panel of the vehicle door; and
using the test jig to test the mobility of the door glass within the vehicle door.

18. A method that includes using a test jig having a mounting block detachably mounted on a door panel of a vehicle door and an adjustment block that has a vertical part to which a belt weatherstrip is detachably coupled and a horizontal part connected to the mounting block so as to be adjustable relative to the mounting block, wherein the method comprises:
mounting the mounting block on an upper end of the door panel;
coupling the belt weatherstrip to the vertical part of the adjustment block;
adjusting a gap between the vertical part of the adjustment block and a door glass of the vehicle door; and
coupling the horizontal part of the adjustment block to the mounting block after adjusting the gap.

19. The method of claim 18, further comprising assembling the vehicle door by assembling a door glass between an inner panel and an outer panel of the vehicle door.

* * * * *